June 13, 1950 — A. N. TURNQUIST — 2,511,607

FLUID-PROPELLED AIRPLANE

Filed July 17, 1948 — 4 Sheets-Sheet 1

Inventor
Alexander N. Turnquist
by Harry H. Hitzeman
Attorney.

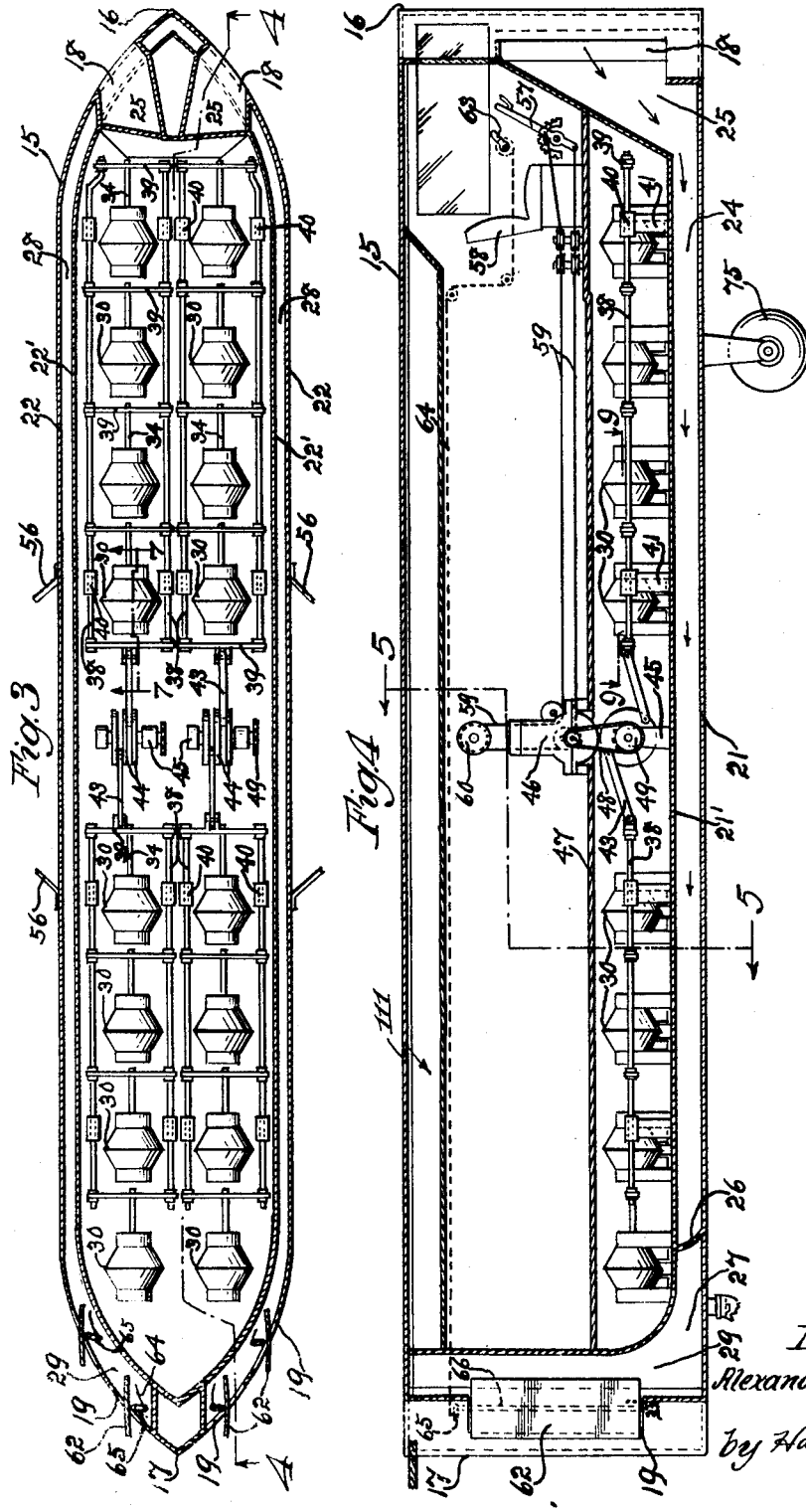

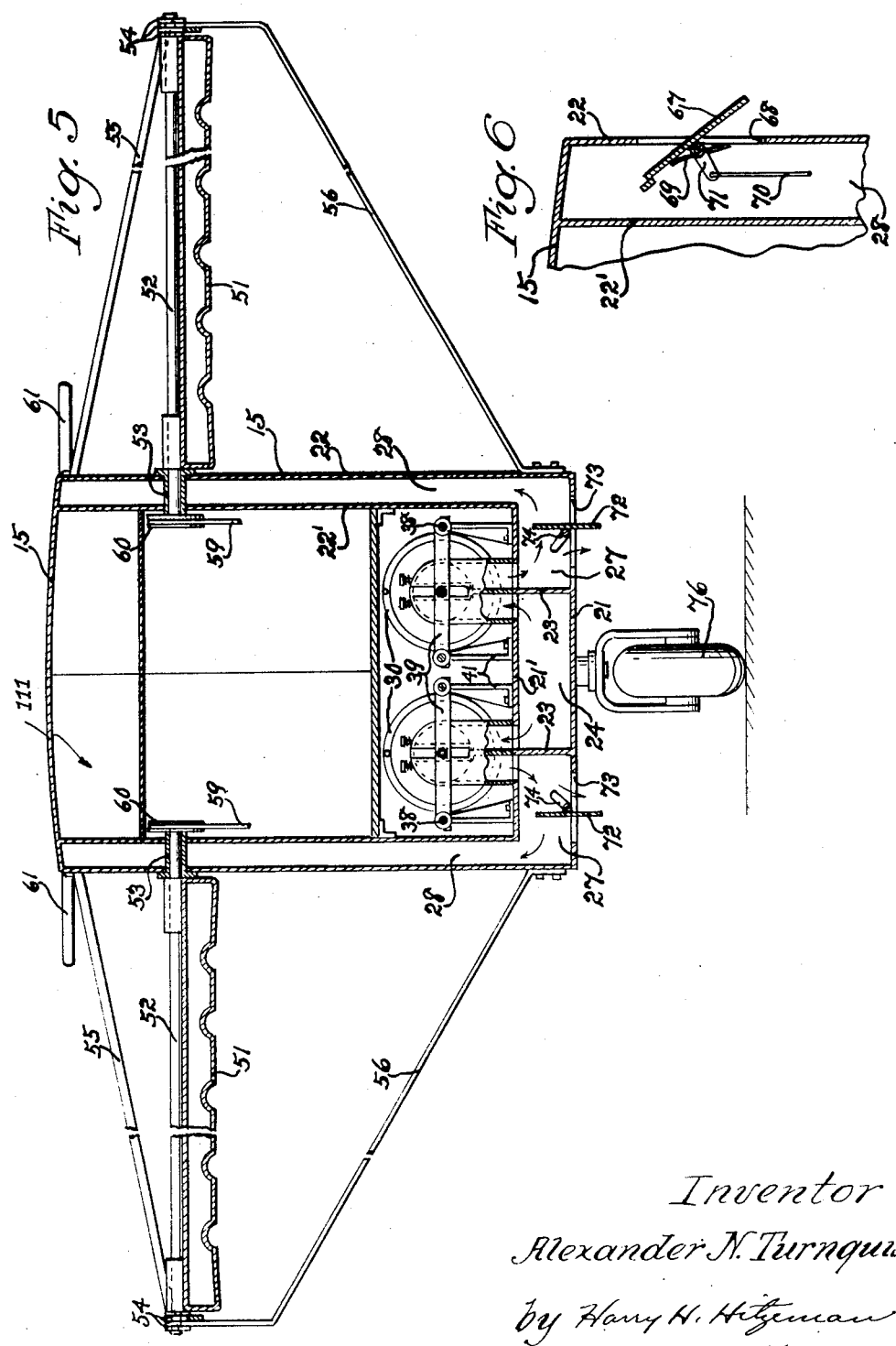

June 13, 1950 A. N. TURNQUIST 2,511,607
FLUID-PROPELLED AIRPLANE
Filed July 17, 1948 4 Sheets-Sheet 4
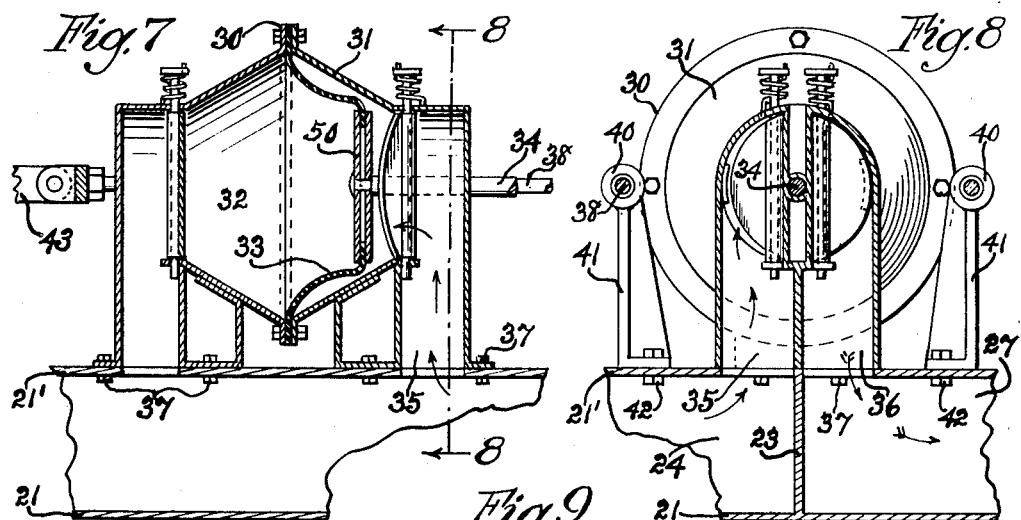
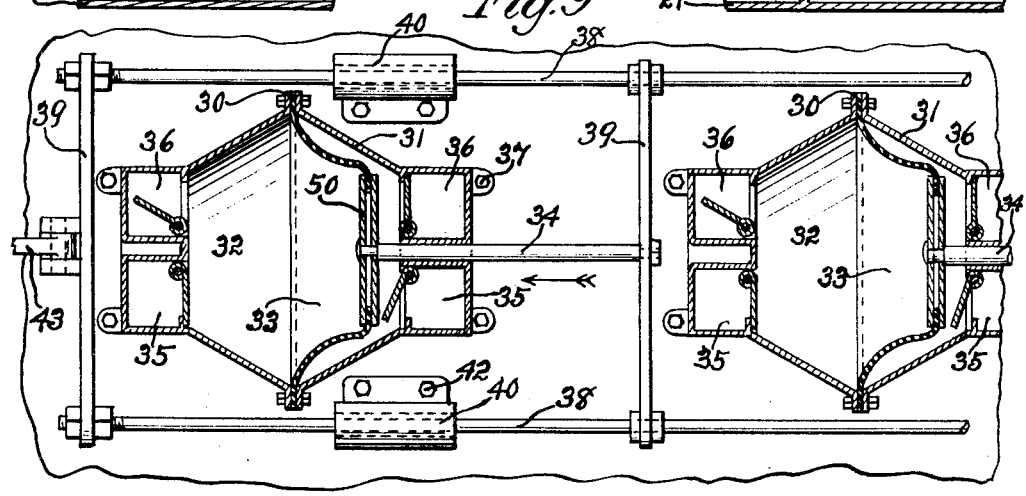
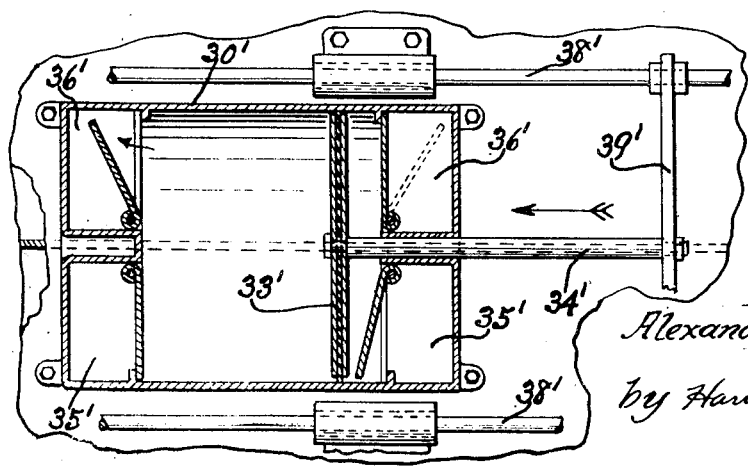
Inventor
Alexander N. Turnquist
by Harry H. Hitzeman
Attorney.

Patented June 13, 1950

2,511,607

UNITED STATES PATENT OFFICE 2,511,607

FLUID-PROPELLED AIRPLANE

Alexander N. Turnquist, Glen Ellyn, Ill.

Application July 17, 1948, Serial No. 39,236

1 Claim. (Cl. 244—15)

My invention relates to improvements in planes or other types of flying machines of the type which are normally buoyant or practically so and improved means for driving the same.

In airplanes and other types of flying machines, now in use the driving means or propelling means is customarily placed on the outside thereof, usually at the forward or at the rearward part of the body or of the wings, and bladed rotary, motor-driven propellers are generally used which operate exposed in the atmosphere.

Other types operate on the jet principle creating the lifting and forward thrust by means of fuel operated jet mechanisms which create a noise practically as loud as engine-driven propellers.

It is the chief object and purpose of this invention to provide a plane or flying machine having tanks or helium or similar gases for lifting the plane and novel means for driving or propelling it in a relatively quiet manner, and preferably by utilizing quietly running driving means all housed within the plane body, instead of out in the open to create disturbing sound waves that are distributed forwardly of the traveling plane.

Another object of this invention is to provide quiet propulsion means for planes or flying machines, which are much less noisy than the now customary engine driven bladed propellers that rotate outside of the body of the plane.

Another object of this invention is to provide driving or propelling means for planes or flying machines which draws the air in at the front of the plane, to rarify the air there, and then forces the air rearward to expel it forcefully at the rear of the plane to condense it there, and by reaction of the air causes a forward motion of the plane, thus operating substantially by means referred to as rocket or pushing action, the same being however distinguished from the jet propulsion principle wherein air is taken in, compressed, heated and transformed into kinetic energy at the orifice of the discharge nozzle.

A further object of this invention is to equip such quietly driven aircraft with tiltable wings, to aid in speeding the ascent and descent of the plane.

These and various other objects and advantages are attained with this invention, as will become apparent from the following description, taken in connection with the accompanying drawings wherein the invention is shown in its preferred form, it being evident that other arrangements and forms of construction may be resorted to for carrying out the objects and purposes of this invention.

In the drawings:

Fig. 3 is a slightly enlarged horizontal sectional view, taken on line 3—3 of Fig. 2.

Fig. 4 is a vertical sectional view, taken on line 4—4 of Fig. 3.

Fig. 5 is an enlarged cross-sectional view, taken on line 5—5 of Fig. 4.

Fig. 6 is an enlarged sectional view, taken on line 6—6 of Fig. 2 showing the air outlet channel with port and shutter in the side of the plane body.

Fig. 7 is an enlarged vertical sectional view of the air forcing means and the channel means, taken on line 7—7 of Fig. 3.

Fig. 8 is a cross-sectional view thereof, taken on line 8—8 of Fig. 7.

Fig. 9 is an enlarged horizontal sectional view thereof, taken on line 9—9 of Fig. 4.

Fig. 10 shows a modified form of air forcing means or pump.

The drawings illustrate aircraft embodying my invention, in its preferred form of construction. It comprises an oblong and relatively slender plane body 15 which is contracted to an edge at its two end parts thereby providing a sharp front and/or nose 16 and a sharp rear end or stern 17, to reduce air resistance during its travel.

Figure 1:
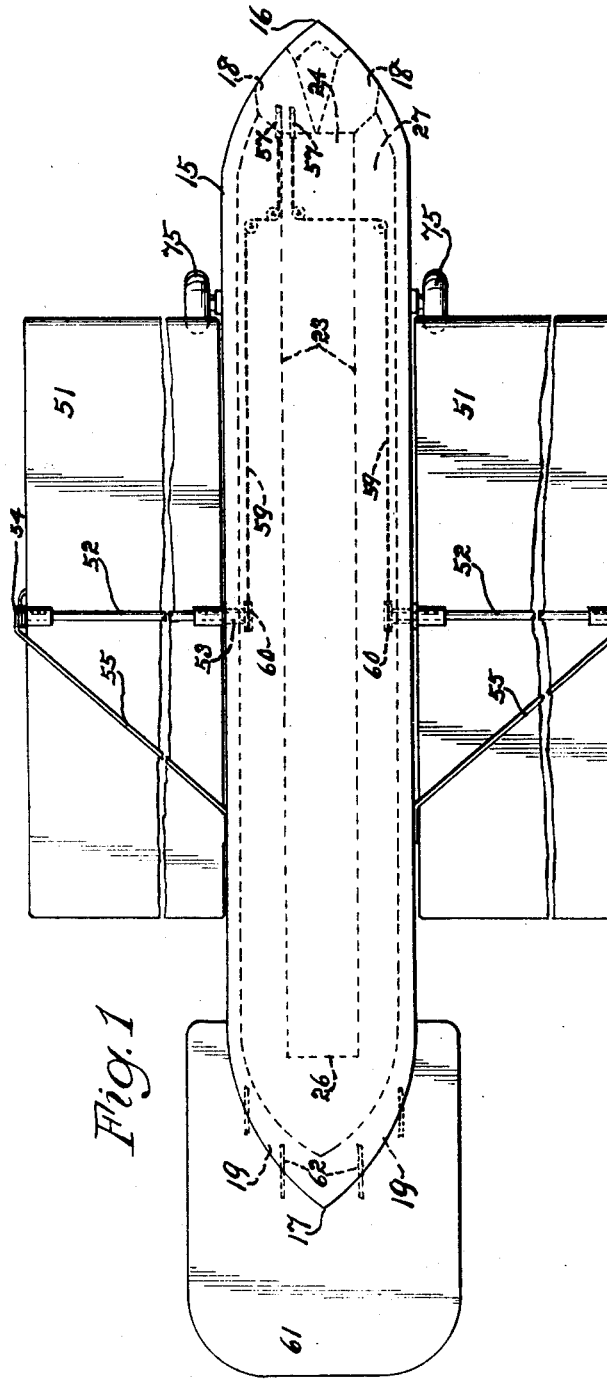
Fig. 1 is a plan view of aircraft embodying my invention.

The body 15 is provided with air inlet means or intake ports 18 at its front end, adjacent nose 16, and with air outlet means or expelling ports 19 at its rear, adjacent stern 17; while channel means are extended longitudinally thru the body, between said air inlet and air outlet means, the same being preferably provided by making some of the walls double or hollow, as indicated in the drawings, including the double bottom wall with spaced wall parts 21 and 21', and the double side walls with spaced wall parts 22 and 22', with partitions 25 extending longitudinally of the body between said wall parts 21 and 21', as best shown in Figs. 1 and 5.

Figure 2:
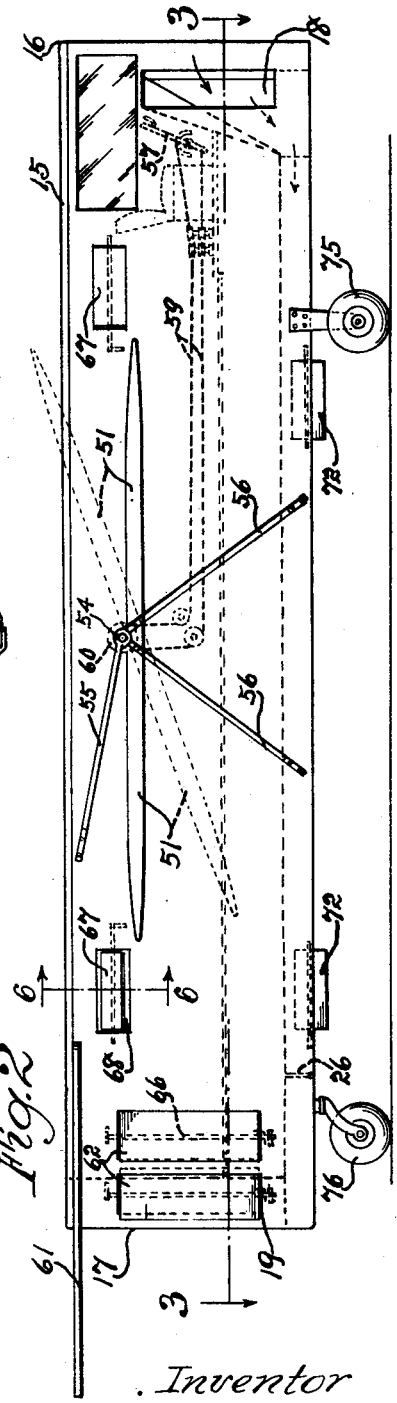
Fig. 2 is a side elevational view thereof.

This arrangement provides a middle air inlet channel 24, between the partitions 23, which is connected by an enlarged front channel part 25, with the air inlet ports 18 and extends therefrom rearward to a rear closing wall or end 26, as shown in Figs. 2 and 4. At the two sides of said air inlet channel 24 these partitions 23 provide outlet channels 27 in the hollow bottom wall; and in this form these channels 27 are in communication with outlet channels 28 provided between the side wall parts 22 and 22', which side channels may extend part way or all the way up the side walls. Said outlet channels 27 and 28 extend the length of the body and are joined by an enlarged rear channel part 29 to the rear outlet ports 19. The channels 27, 28, and 29 form a storage chamber into which air is pumped and compressed whenever none of the jets or outlet ports are open.

Air forcing means is associated with the inlet channels to force the air there thru, and to draw it in from in front of the body, store it in the tank provided, and expel it rearwardly therefrom, said means being provided in the form of quietly running members housed in the body 15, being preferably in the shape of piston-equipped members, such as double acting pumps or air forcing members 30; and these are preferably arranged in a plurality of rows or sets of pumps, as indicated in Fig. 3. Each pump comprises a casing 31 provided with a main piston chamber 32 having a piston 33 operable centrally therein and movable close to both valved ends, operable by a piston rod 34 projecting from the casing; while at each end of the casing is an air inlet chamber 35 and an air outlet chamber 36, connected by a valve with piston chamber 32, the two inlet chambers 35 at the two ends being in communication with the inlet channel 24, and the two outlet chambers 36 being in communication with the storage tank formed by the outlet channels 27, 28, and 29 as shown in Figs. 8 and 9. Said chambers 35 and 36 along with the piston casing 31 are secured to the bottom wall part 21' by suitable bolts 37 or the like.

In one form of the invention, the air forcing members or pumps 30 of one set may be arranged so that they can be operated together, while the several sets may be arranged so that either some of the sets or all of them may be operated at a time, while one or more sets may be left idle. In this disclosed form a pair of rods 38 extend along the two sides of the set of pumps, and crossbars 39 are connected thereto and to the piston rods 34 of the set; and said rods are slidable in sleeves 40 provided on brackets 41 mounted on the bottom wall parts 21', with bolts 42 or the like. A link 43 is connected to the inward bar 39 of a set and to a wheel or crank device 44 rotatably mounted on a bracket 45 supported on said wall part 21'.

A suitable power plant or driving engine is provided, such as the engine 46 shown mounted centrally of the floor 47 of the body 15, and it has suitable driving connections with the device 44, as for example a chain drive 48 which actuates a wheel 49 on the shaft of said device 44 to drive the same. Two sets of these pumps or air forcing members 30 are preferably placed in a row and connected to a crank device 44; and one engine may be used for driving each row of two sets of pumps, or it may be used for driving several rows.

The link 43, at either or at both of its connections, with bar 39 and with device 44, is arranged so that it may be readily detached therefrom, in order that any set of pumps may be either included with or may be detached from operation with the other set, if desired.

The piston 33 may consist of flexible material, such as rubber or rubberized substance, in the shape of a diaphragm having its peripheral part secured to the casing wall, and including a rigid central part 50 thereon which is secured to the piston rod 34. This provides a very quietly running device for forcing the air into the storage tank for later ejection, and it has no sliding piston to require lubricant.

A modified form of pump construction is shown in Fig. 10, wherein the pump 30' may be in the shape of a cylinder having a slidable piston 33' therein with a rod 34' extending therefrom to the cross-bar 39' of the slidable rods 38', said cylinder having at each end a valved air inlet chamber 35' and a valved air outlet chamber 36', as in the preceding form. While this piston 33' is disk-like and requires some lubricant, it may be preferable under some conditions and operates in the same manner to introduce air to the storage tank for compression there and later ejection.

Suitable wing means is provided on the body, and in the form of construction illustrated the same comprises two wings 51 adjustably mounted on the opposite sides of the body 15, each being mounted on a shaft 52 which is supported by means 53 in the side wall of the body and by means 54 on the outer ends of upper and lower brace rods 55 and 56, respectively, that extend from the body. The wings are controlled by suitable means, for example, by a lever provided near the pilot's seat 58, for each wing, and means 59 which operably connects the lever with a member 60 on the inner end of the wing shaft 52; so that the wings may be set at a desired tilt or angle to aid in the elevational movement of the airplane, and likewise either wing may be tilted independently and to a different degree than the other, in maneuvering the airplane. Altho two wings are shown herein, more may be used if desired.

In order to secure sufficient buoyancy for the aircraft, I have provided an elongated helium gas storage tank 111 adjacent the top of the body 15 and have made wings 51 hollow so that each of the wings may act as helium storage tanks thereby distributing the lifting medium thruout the length and width of the aircraft body and wings. Thus normally any release of air from the storage tank will propel the aircraft and ascending or descending is easily controlled by the tiltable wings. Suitable stabilizer means is also provided, and in the present form a stabilizer 61 is mounted on the rear part of the body. Air deflecting members or deflectors 62 are adjustably mounted in the air outlet ports 19, and are operable by suitable means, such as control means 63 located near the pilot's seat 58, and means 64 connecting the same with an arm 65 on a pivoting shaft 66 which is connected to the deflecting member 62 providing a vertical axis therefor.

These deflectors may thus be set parallel with the longitudinal axis of body 15, as shown in Fig. 3, so that the air is normally expelled directly rearwardly of the body for forward travel; and the deflectors may also be set at a suitable angle, so that the air will be expelled in a direction laterally of the body, or some of them may be closed, and thru the reaction of the outflowing air thus move the rear end of the body in the opposite direction, for steering the airplane. Other deflectors, in the form of shutters, may also be provided to aid in the ascent of the airplane, for example, the shutters 67 mounted in ports 68 provided in the side wall parts 22 and on the outlet channels 28, as shown in Figs. 2 and 6; these shutters being urged to closed position by a spring 69, and being adjustably openable by operating means 70 extending from an arm 71 on the shutter, so as to deflect the air downwardly. Similar shutters 72 are mounted in ports 73 provided in the bottom wall part 21, as shown in Figs. 2 and 5; these shutters being adjustably openable by suitable means 74 connected thereto, to deflect the air downwardly; and by the reaction of the forcefully expelled air thru the selected opened shutters to buoy the airplane during its ascent. These shutters are adapted to be operated in conjunction with the upwardly tilted wings, for aiding in the ascending movement of the airplane.

Suitable landing means is also provided, as front wheels 75 and a rear wheel 76 mounted on the body, adapted to travel easily over the ground.

While in the description and drawings the particular or most advantageous shape of the shutters or the outlets or jets has not been carefully and scientifically illustrated, it should be borne in mind that the action sought is a jet flow so that the most efficient is of course desirable. The principal object of the present construction is the location of the same at the places desired so that directional control of the aircraft is easily maintained, the speed being of course regulated by the size of the jet openings as controlled by the operator of the aircraft.

While I have illustrated and described a specific embodiment of the invention, it will be apparent to those skilled in the art that changes and modifications may be made in the exact details shown and I do not wish to be limited in any particular, rather what I desire to secure and protect by Letters Patent of the United States is:

In a combined airship and airplane sustained aircraft, an elongated body formed by spaced top and bottom planar walls interconnected by spaced parallel rectangular side walls, arcuately curved apertured end portions terminating at the vertical plane of symmetry of said body and joined to form closed fore and aft ends thereon, a pair of internally located spaced superposed floor members, a pair of separate side walls spaced inwardly of said body walls and supporting one of said floor members, air compressor means mounted between said floor members, spaced vertical walls between the lower floor member and said bottom wall and forming therewith a centrally disposed air intake duct and laterally disposed air pressure chambers between the spaced walls, air passage means connecting said pressure chambers and said intake duct with the said compressors and other passage means connecting said duct and chamber with the apertures in said fore and aft ends, respectively, valves disposed in the apertures to control the air flow to the intake duct and to throttle the air from said pressure chambers for controlling the propulsion force exerted thereby and combined means to support said body aerodynamically comprising hollow wings and an upper chamber in said body adapted to be filled with helium.

ALEXANDER N. TURNQUIST.

REFERENCES CITED

The following references are of record in the file of this patent:

UNITED STATES PATENTS

| Number | Name | Date |
| --- | --- | --- |
| 1,237,364 | Miller | Aug. 21, 1917 |
| 1,268,494 | Rutzen | June 4, 1918 |
| 1,686,071 | Cavaleri | Oct. 2, 1928 |
| 2,071,221 | Schramm | Feb. 16, 1937 |

FOREIGN PATENTS

| Number | Country | Date |
| --- | --- | --- |
| 406,713 | Great Britain | Feb. 28, 1934 |